(12) United States Patent
Puterbaugh et al.

(10) Patent No.: US 6,726,272 B1
(45) Date of Patent: Apr. 27, 2004

(54) TRUCK CAB SUSPENSION SYSTEM

(75) Inventors: Benjamin S. Puterbaugh, Fort Wayne, IN (US); Anthony D. Sutton, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 47 days.

(21) Appl. No.: 10/279,683

(22) Filed: Oct. 24, 2002

(51) Int. Cl.$^7$ .............................................. B60R 27/00
(52) U.S. Cl. ............................. 296/190.01; 296/190.07
(58) Field of Search ....................... 296/190.01, 190.07; 180/89.12, 89.13; 188/371, 376, 377

(56) References Cited

U.S. PATENT DOCUMENTS

| | | | | |
|---|---|---|---|---|
| 3,948,341 A | * | 4/1976 | Foster | 180/89.15 |
| 4,451,079 A | * | 5/1984 | Takahashi | 296/190.07 |
| 5,299,651 A | * | 4/1994 | Wilson | 180/89.12 |
| 5,984,036 A | * | 11/1999 | Higuchi et al. | 296/190.01 |
| 6,029,764 A | * | 2/2000 | Schubert | 296/190.07 |
| 6,067,491 A | * | 5/2000 | Takahashi | 296/190.01 |
| 6,086,059 A | * | 7/2000 | Runesson et al. | 188/376 |
| 6,408,970 B1 | * | 6/2002 | Eng | 180/89.12 |
| 6,431,332 B1 | * | 8/2002 | Phelizot | 188/376 |
| 6,478,102 B1 | * | 11/2002 | Puterbaugh et al. | 180/89.12 |

\* cited by examiner

*Primary Examiner*—D. Glenn Dayoan
*Assistant Examiner*—Lori L Coletta
(74) *Attorney, Agent, or Firm*—Jeffrey P. Calfa; Dennis Kelly Sullivan; Susan L. Lukasik

(57) ABSTRACT

Two and four point truck cab suspensions comprise combined spring/damping element units at at least the rear corners of the cab, and preferably at all four corners of the cab.

14 Claims, 5 Drawing Sheets

TRUCK CAB SUSPENSION SYSTEM

BACKGROUND OF THE INVENTION

1. Field of the Invention

The present invention relates to secondary suspension systems for trucks and, more particularly, to a truck cab suspension system providing a high degree of noise and shock isolation.

2. Description of the Prior Art

The load carried by a truck is supported by a frame which is resiliently carried by suspension springs from the truck's axles. The primary axle suspension springs usually have very high spring rates which make the ride jarring to the operator and to structures supported by the frame. To dampen the vibration and shock transmitted to the cab, secondary suspension systems have been employed utilizing conventional suspension components such as air springs to isolate the cab structure from shock and shock absorbers to dampen motion of the cab, respectively. Shock and vibration isolation improves occupant comfort and reduces stress fatigue to the cab structure.

Secondary suspension systems connect the cab to, and support the cab from, the vehicle chassis. The secondary suspension system must support the cab's weight, guide vertical, lateral and fore to aft movement of the cab, improve ride comfort by isolating the cab from vibrations and dampening those vibrations, absorb collision energies, and if desired, provide cab leveling.

Early cab suspension systems placed hard rubber element directly between the cab and the vehicle frame. This sort of minimal suspension system proved uncomfortable for the vehicle's occupants and could place undesirable force levels on the cab promoting premature structural failure.

Later cab suspensions provided differentiated forward and aft suspension sub-systems making use of a rear suspension sub-system having air springs or coil springs, a guide element based on a panhard rod or other lateral locators, and a dampening element. The air spring and damping elements of the rear suspension sub-system do not provide fore to aft constraints to cab movement. This forces the use of very stiff forward rubber elements which exhibit poor noise isolation.

Europe has favored cab over engine designs due in part to the tight space constraints of many European roads. Typical linehaul European trucks have increasingly been equipped with a cab suspension having suspensive and damping elements located outside of the chassis siderails, that is, toward the outside edges of the truck cab. The suspension element, e.g. the spring, and the damping element, e.g. the shock absorber, are provided as a combined strut, one strut being located at each of the four outer corners of the cab. The top of the strut is attached to the bottom of the cab by a rubber bushing. See Gross, et al., *Development of a 4-point-Air Cab Suspension System for Conventional Heavy Trucks* (SAE Technical paper 2001-01-2708). However, the weight of the cab is suspended through the primary springs and the bushings, placing the bushings under compression. This has, in practice, required the provision of higher spring rate bushings than would be required if the bushings were not under constant compressive loading.

SUMMARY OF THE INVENTION

According to the invention there is provided a vehicle having a suspended cab. The vehicle has a chassis with elongated side rails. The truck cab suspension comprises a plurality of support points for the truck cab positioned on an underside of the truck cab, including two forward support points and two aft support points located near corners of the truck cab. At least two spring-strut units, one each attached to the two aft support points provide for support of the aft portion of the cab. Each spring-strut unit comprises a spring element, a shock dampening element, a yielding bushing interposed between the shock dampening element and the respective aft support point for the spring-strut unit, and a non-yielding brace element interposed between the spring element and the support point. For a four point suspension the truck cab suspension additionally comprises the two forward support points to the truck cab being disposed on the underside of the truck cab substantially forward from the rear support points and toward outside side edges of the truck cab. Two forward spring-damper strut units are attached, one to each of the forward support points. The spring-damper strut units each having a spring element, a shock dampening element, a bushing interposed between the shock dampening element and a respective forward support point, and a non-yielding mount interposed between the spring and the respective forward support point.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
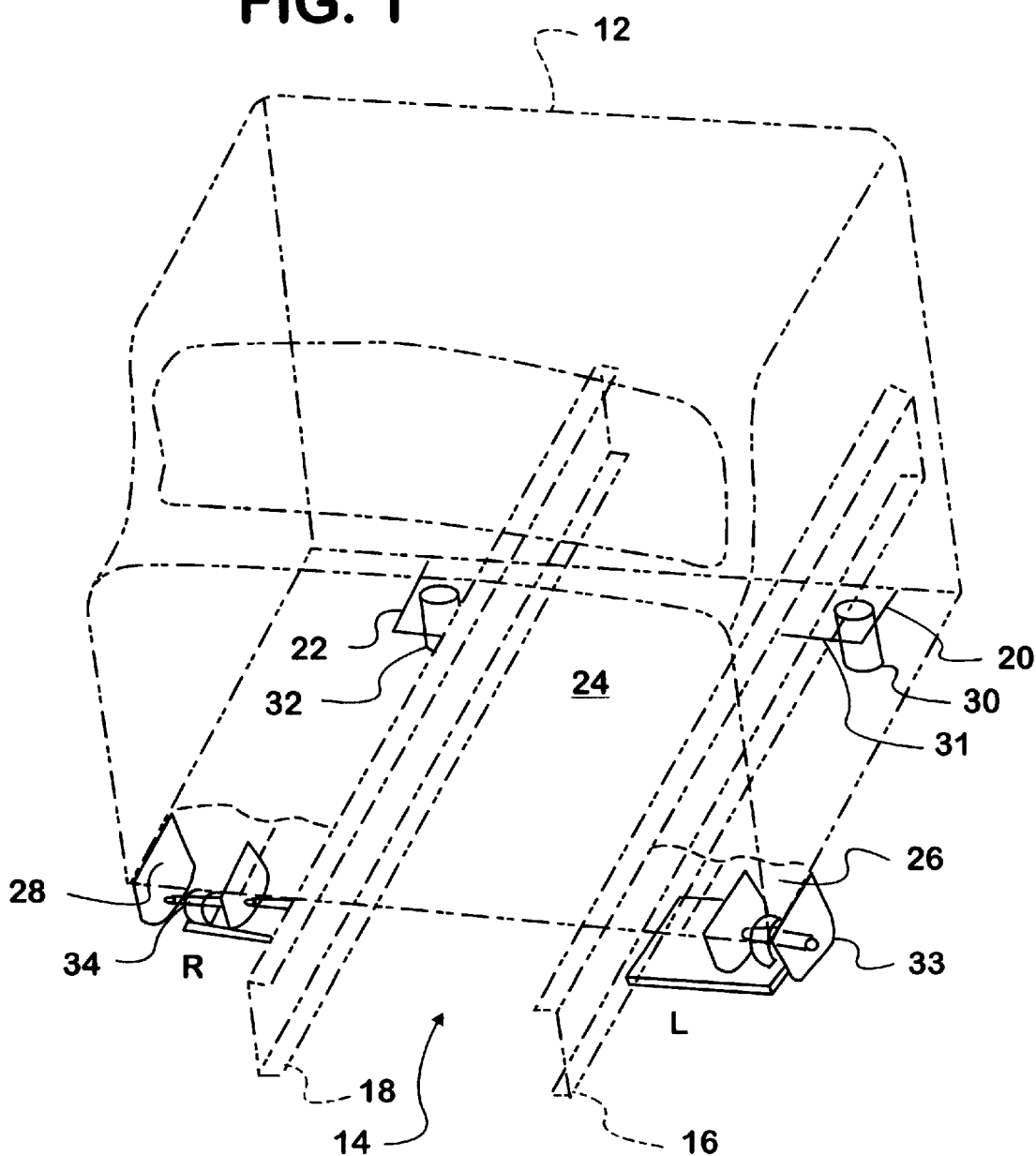
FIG. 1 is a perspective view of a truck cab suspended in accordance with a first embodiment of the invention.

Referring now to the figures and in particular to FIG. 1, a truck cab 12 disposed on a truck chassis 14 is depicted. Truck chassis 14 comprises two longitudinal siderails 16 and 18 running the lengths of the left side (L) and the right side (R) of a truck or tractor unit. Truck cab 12 is suspended from the side rails at four support points 20, 22, 26 and 28 on the underside 24 of the cab. The four support points are located generally toward the corners of cab underside 24. Support points 20, 22, 26 and 28 are preferably provided along a section of a beam or channel forming a portion of the frame for the cab superstructure.

Figure 2:
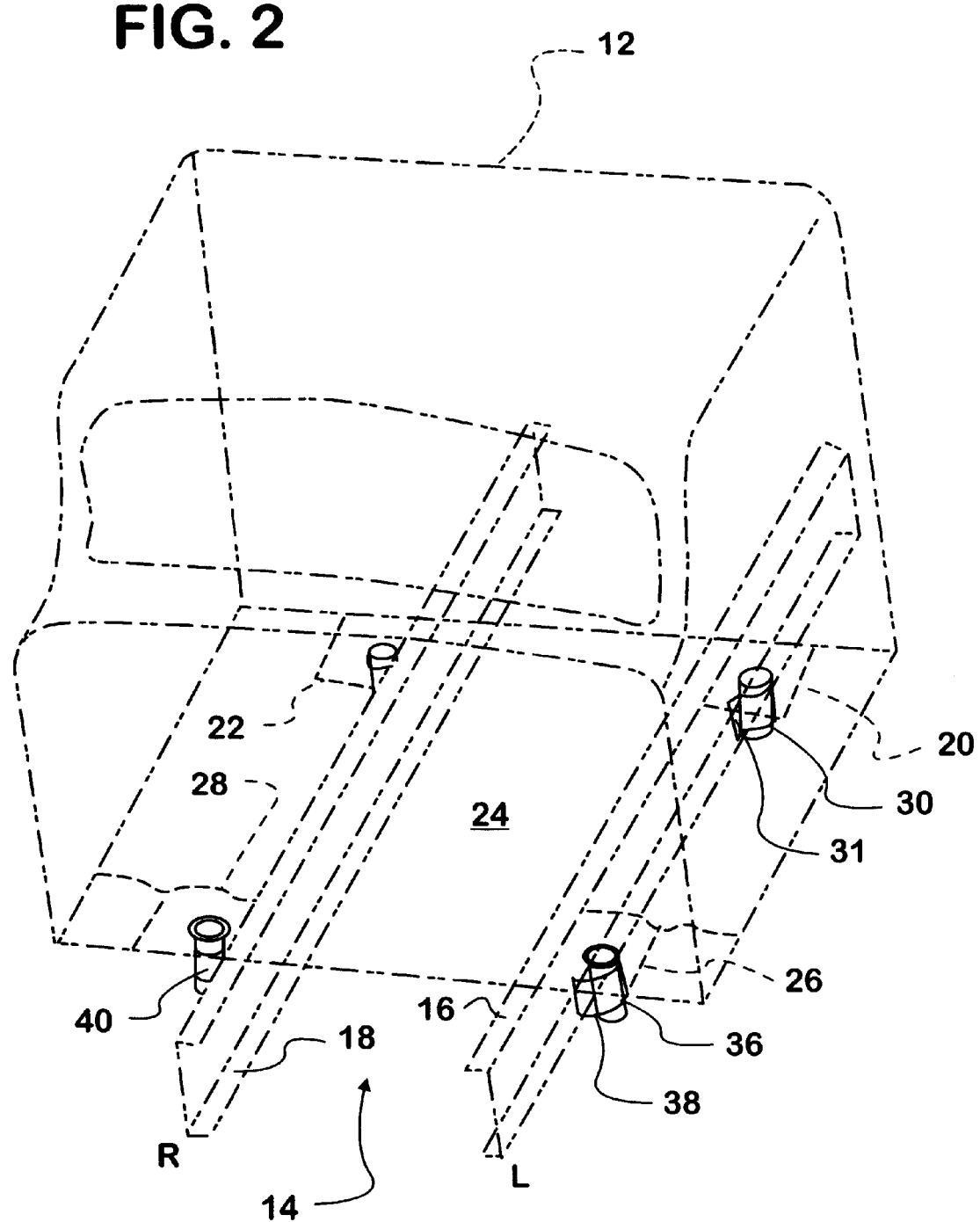
FIG. 2 is a perspective view of a truck cab suspended in accordance with a second embodiment of the invention.

Cab 12 is suspended from siderails 16 and 18 by forward and aft suspension subsystems, the aft suspension subsystem comprising two spring-strut units 30 and 32, and the forward suspension subsystem comprising rubber block assemblies 33 and 34. Spring-strut units 30 and 32 are mounted with respect to siderails 16 and 18, respectively, by mounting arms attached to the outside face of the siderails (only mounting arm 31 for spring-strut 30 is visible). The mounting arms may be attached in any conventional manner, for example by bolting, welding, screwing, and the like. Spring-strut units 30 and 32 are attached to aft support points 20 and 22 on truck cab 12, respectively. Rubber block assemblies 33 and 34 are of types well known in the art and are not described in detail. They provide suspension, damping and guiding functions for the suspended weight and are attached both to the siderails 16 and 18 and to support points 26 and 28 by open brackets which are linked by a rubber bushing. The type of suspension illustrated in FIG. 1 is termed a 2-point suspension in the art. It otherwise provides an inferior ride to 4-point suspensions due to the poor shock isolation through the rubber blocks. An alternative 4-point suspension is illustrated in FIG. 2. Forward rubber block assemblies 33 and 34 have been replaced by spring-strut units 36 and 40. Spring-strut units 36 and 40 are identical to the aft spring strut units. They are attached to siderails using mounting arms (with mounting arm 38 for left forward spring-strut unit 36 being visible). The preferred locations for the spring-strut assemblies are outside of the siderails 16 and 18 toward the horizontal perimeter of the cab 12.

Figure 3:
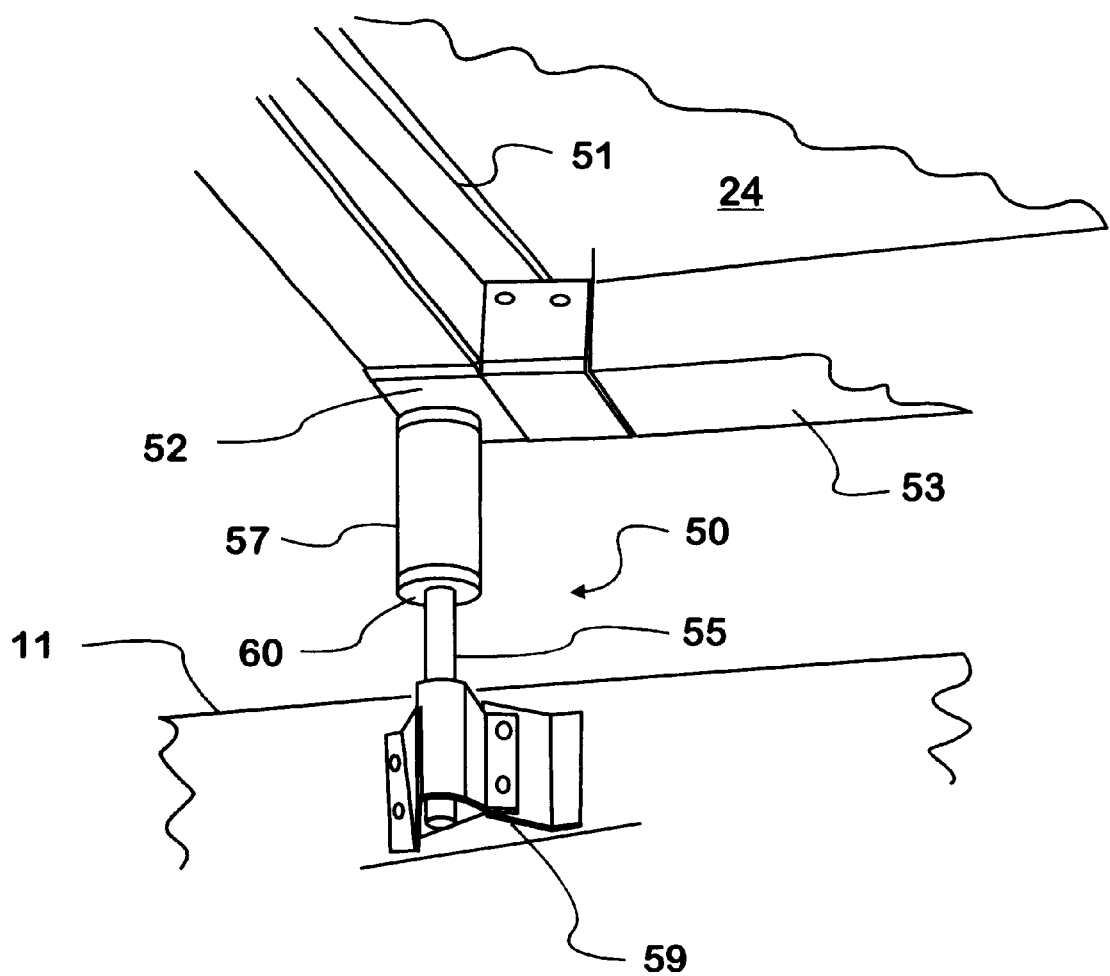
FIG. 3 is a perspective view of a cab suspension element.

In FIG. 3 the location and positioning of an exemplary spring-strut unit 50 is illustrated. Unit 50 is located between the underside 24 of a cab 12 one of the major longitudinal siderails 11 of a vehicle. Extending from the outward side of siderail 11 is a mounting arm 59, which is a generally A-shaped piece, attached at its feet to siderail 11. A rod or pillar 55 is firmly fixed in the head of the "A" above the cross-arm and supports a co-axial assembly 57 of the spring and shock dampening strut of the unit-on a base 60. Co-axial assembly 57 abuts a support point 52 formed at the intersection of two frame support beams 51 and 53 forming part of the structure of cab 12.

Figure 4:
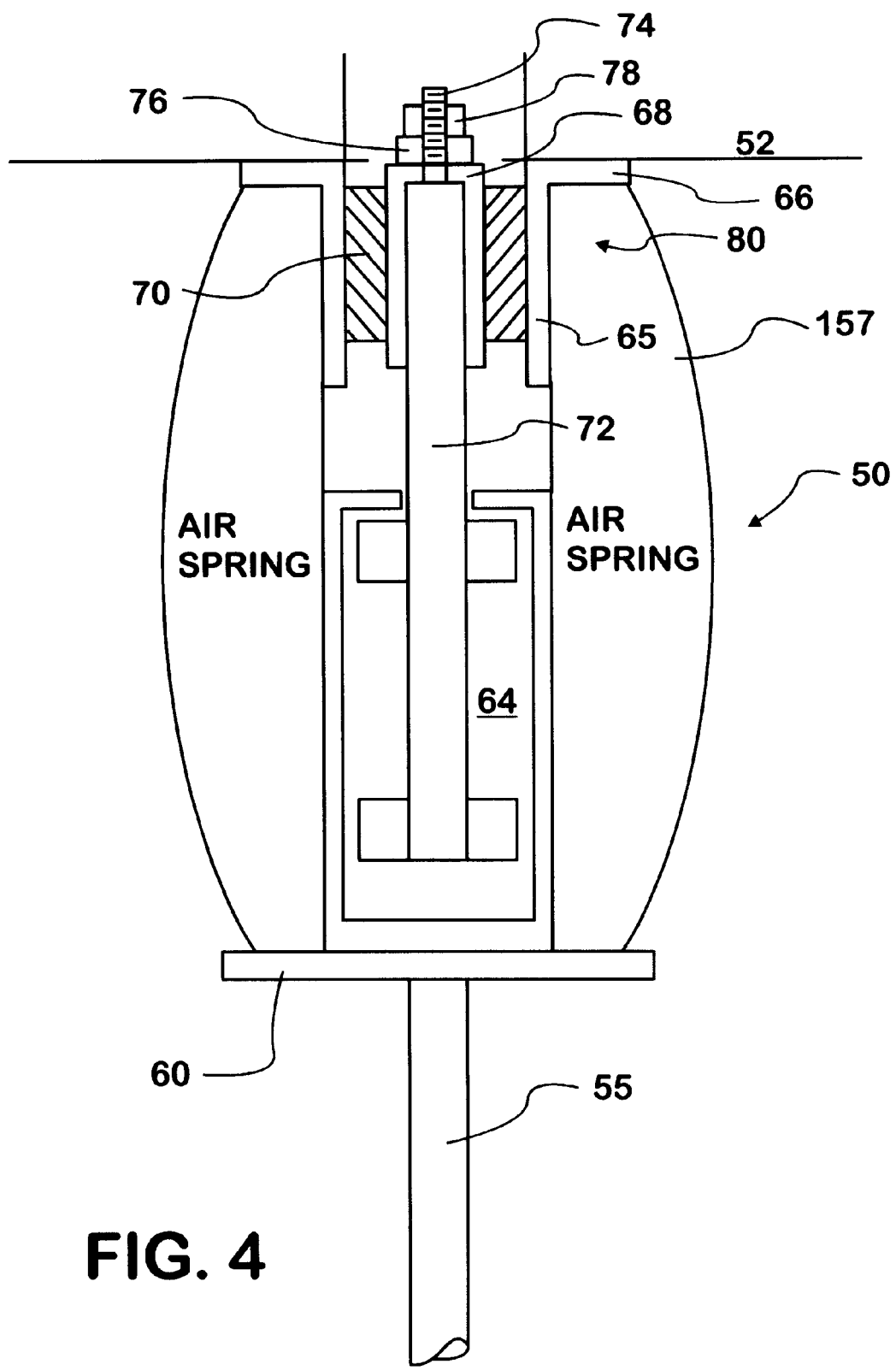
FIGS. 4 and 5 are cross sectional views of the two embodiments of a suspension-strut element.
Figure 5:
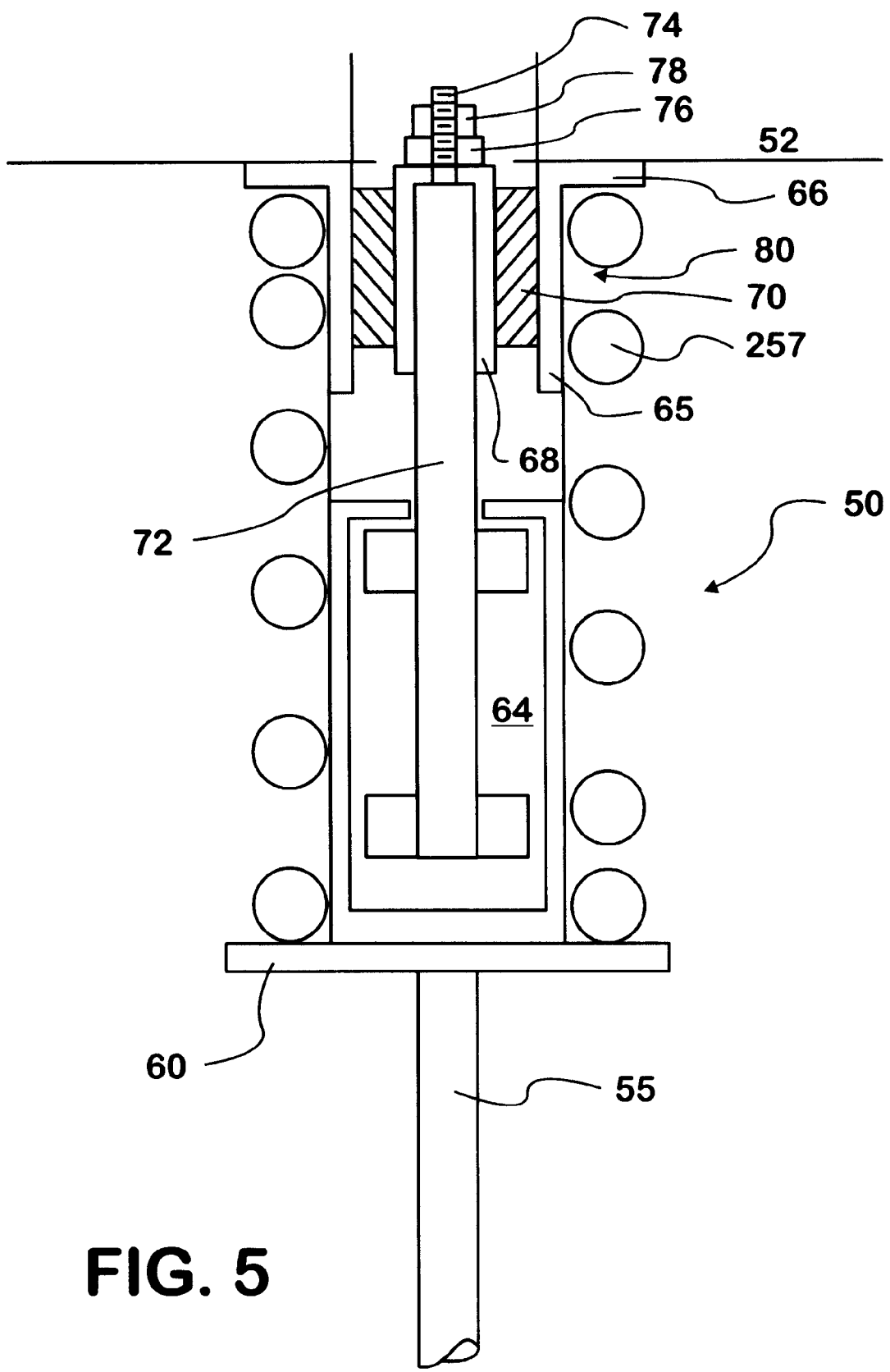

Spring-strut units 50 can be based on a metal coil spring or an air spring. FIGS. 4 and 5 detail differences in construction of the two types of spring-strut units 50 in cross sectional views. Located between base 60 and an exemplary support point 52, spring-strut unit 50 can have either a coil spring 257 or an air spring 157 as a suspension element. Either type of suspension unit is arranged around a shock dampening element 64 to be co-axial with the shock dampening element on strut 72. Spring-strut unit 50 is mated to a support point 52 using a bushing assembly 80. Bushing assembly 80 comprises an outer sleeve 65 having out turned flange 66, an inner barrel 68, and a rubber sleeve 70 located between the inner barrel and the outer sleeve and fused to each. The rubber sleeve 70 has different spring rates in different directions to achieve cab stability. Inner barrel 68 has some freedom of movement as a result of the compressibility of rubber sleeve 70. The suspension element (springs 157 or 257) bypass the rubber sleeve 70 so that the bushing does not carry the weight of the cab and compromising the compression characteristics of the rubber.

Strut 72 has one end which is disposed in and can move up and down with respect to shock dampening element 64. The opposite end is firmly retained barrel 68 by a bolt 74 which extends upwardly through an opening in the barrel end allowing a retaining washer 76 and bolt 78 to be applied thereto. Outer sleeve 65 is attached to support point 52, preferably by spot welding of flange 66 to the support point. Sleeve 65 provides a support area for receiving one end of either air spring 157 or coil spring 257. Thus, strut 72, and the shock dampening element of the unit are isolated from the cab by a rubber bushing, while the shock isolation provided by the springs is not so isolated.

The invention provides an advantageous cab suspension that allocates load to the several support points of the cab fairly evenly. With struts solidly attached to the frame, fore/aft as well as lateral, yaw and pitching forces are more readily shared by the front and the rear of the cab structure. Adequate vertical movement is still allowed for providing a soft ride. The various compression rates of the rubber bushings can be varied to provide variable amounts of freedom of movement in various directions.

While the invention is shown in only one of its forms, it is not thus limited but is susceptible to various changes and modifications without departing from the spirit and scope of the invention.

What is claimed is:

1. A truck cab suspension, comprising:

a truck chassis having a left siderail and a right siderail;

a truck cab having an underside and positioned with respect to the truck chassis with the underside above the left and right siderails;

left and right side aft support points to the truck cab disposed on the underside of the truck cab and located substantially adjacent a rear edge of the truck cab, the left aft support point being located just outward from the left siderail and the right aft support point being located just outward from the right siderail;

a left aft spring-damper strut unit mounted between the left siderail and the left aft support point;

a right aft spring-damper strut unit mounted between the right siderail and the right aft support point;

the spring-damper strut units each having a spring element and a shock dampening element with a bushing interposed between the shock dampening element and a respective aft support point; and left and right side mounts for the spring elements of the respective spring-damper struts mounts to the left aft and right aft support points directly coupling spring action to the truck cab.

2. A truck cab suspension as set forth in claim 1, further comprising:

left and right side forward support points to the truck cab disposed on the underside of the truck cab, the left aft forward support point being located outward from the left siderail and the right aft support point being located outward from the right siderail;

a left forward spring-damper strut unit mounted between the left siderail and the left forward support point;

a right forward spring-damper strut unit mounted between the right siderail and the right forward support point;

the spring-damper strut units each having a spring element and a shock dampening element with a bushing interposed between the shock dampening element and a respective forward support point; and left and right side mounts for the spring elements of the respective spring-damper struts mounts to the left aft and right forward support points directly coupling spring action to the truck cab.

3. A truck cab suspension as set forth in claim 1, further comprising:

left and right side forward support points to the truck cab disposed on the underside of the truck cab, the left aft forward support point being located outward from the left siderail and the right aft support point being located outward from the right siderail;

a left forward bushing mounted between the left siderail and the left forward support point; and a right forward bushing mounted between the right siderail and the right forward support point.

4. A truck cab suspension as set forth in claim 2, the spring element being a coil spring.

5. A truck cab suspension as set forth in claim 2, the spring element being an air spring.

6. A truck cab suspension as set forth in claim 3, the spring element being a coil spring.

7. A truck cab suspension as set forth in claim 3, the spring element being an air spring.

8. A truck cab suspension comprising:

a plurality of support points for the truck cab positioned on an underside of the truck cab, including two forward support points and two aft support points located near rear corners of the truck cab;

two spring-strut units, one each attached to the two aft support points; and each spring-strut unit comprising, a spring element, a shock dampening element, a yielding bushing interposed between the shock dampening element and the respective aft support point for the spring-strut unit, and a non-yielding brace element interposed between the spring element and the support point.

9. A truck cab suspension as set forth in claim 8, further comprising:

the two forward support points to the truck cab being disposed on the underside of the truck cab substantially forward from the rear support points and toward outside side edges of the truck cab;

two forward spring-damper strut units, one attached to each of the forward support points; and the spring-damper strut units each having a spring element, a shock dampening element, a bushing interposed between the shock dampening element and a respective forward support point, and a non-yielding mount interposed between the spring element and the respective forward support point.

10. A truck cab suspension as set forth in claim 8, further comprising:

two forward support points to the truck cab disposed on the underside of the truck cab toward the outside edges of the cab relative a cab longitudinal center line; and two forward bushings, one attached to each of forward support points.

11. A truck cab suspension as set forth in claim 9, the spring element being a coil spring.

12. A truck cab suspension as set forth in claim 9, the spring element being an air spring.

13. A truck cab suspension as set forth in claim 10, the spring element being a coil spring.

14. A truck cab suspension as set forth in claim 10, the spring element being an air spring.

\* \* \* \* \*